US010241799B2

(12) United States Patent
Bourd et al.

(10) Patent No.: US 10,241,799 B2
(45) Date of Patent: Mar. 26, 2019

(54) OUT-OF-ORDER COMMAND EXECUTION WITH SLIDING WINDOWS TO MAINTAIN COMPLETION STATUSES

(75) Inventors: Alexei V. Bourd, San Diego, CA (US); Guofang Jiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1447 days.

(21) Appl. No.: 12/837,600

(22) Filed: Jul. 16, 2010

(65) Prior Publication Data

US 2012/0017069 A1  Jan. 19, 2012

(51) Int. Cl.
*G06F 9/30* (2018.01)
*G06F 9/38* (2018.01)
*G06T 1/20* (2006.01)

(52) U.S. Cl.
CPC .......... *G06F 9/3838* (2013.01); *G06F 9/3885* (2013.01); *G06T 1/20* (2013.01)

(58) Field of Classification Search
CPC ..................................................... G06F 9/3838
USPC ................................................. 712/214, 216
See application file for complete search history.

(56) References Cited

U.S. PATENT DOCUMENTS

| 5,430,851 | A | | 7/1995 | Hirata et al. | |
|---|---|---|---|---|---|
| 5,710,902 | A | * | 1/1998 | Sheaffer et al. | 712/216 |
| 5,884,062 | A | * | 3/1999 | Wichman et al. | 712/218 |
| 5,913,049 | A | | 6/1999 | Shiell et al. | |
| 5,941,983 | A | | 8/1999 | Gupta et al. | |
| 6,065,105 | A | * | 5/2000 | Zaidi et al. | 712/23 |
| 6,260,189 | B1 | * | 7/2001 | Batten et al. | 717/151 |
| 6,697,932 | B1 | * | 2/2004 | Yoaz | G06F 9/3824 |
| | | | | | 712/216 |
| 6,889,314 | B2 | | 5/2005 | Samra et al. | |
| 6,950,926 | B1 | * | 9/2005 | Menezes | G06F 9/30076 |
| | | | | | 712/216 |
| 6,950,927 | B1 | | 9/2005 | Apisdorf et al. | |
| 7,055,021 | B2 | * | 5/2006 | Kadambi | 712/217 |

(Continued)

FOREIGN PATENT DOCUMENTS

| EP | 2141586 A1 | 1/2010 |
|---|---|---|
| JP | 2001337822 A | 12/2001 |

OTHER PUBLICATIONS

Kodaka, T., et al., "Design and Implementation of Scalable, Transparent Threads for Multi-Core Media Processor," Design, Automation & Test in Europe Conference & Exhibition 2009, Apr. 20, 2009, pp. 1-5.

(Continued)

*Primary Examiner* — David J. Huisman
(74) *Attorney, Agent, or Firm* — Shumaker & Sieffert, P.A.

(57) ABSTRACT

Techniques are described for reordering commands to improve the speed at which at least one command stream may execute. Prior to distributing commands in the at least one command stream to multiple pipelines, a multimedia processor analyzes any inter-pipeline dependencies and determines the current execution state of the pipelines. The processor may, based on this information, reorder the at least one command stream by prioritizing commands that lack any current dependencies and therefore may be executed immediately by the appropriate pipeline. Such out of order execution of commands in the at least one command stream may increase the throughput of the multimedia processor by increasing the rate at which the command stream is executed.

32 Claims, 9 Drawing Sheets

(56) References Cited

U.S. PATENT DOCUMENTS

| | | |
|---|---|---|
| 7,350,056 B2 | 3/2008 | Abernathy et al. |
| 7,681,016 B2 | 3/2010 | Taylor et al. |
| 8,135,942 B2 * | 3/2012 | Abernathy et al. ........... 712/216 |

OTHER PUBLICATIONS

Hennessy J.L., et al., "Computer Architecture a Quantitative Approach," Third Edition, Morgan Kaufmann Publishers, 2003, pp. 181-189.
Patterson D.A., et al., "Computer Architecture: A Quantitative Approach for Design, Implementation and Assessment," First Edition, 2nd press, Nikkei Business Publications, Inc., May 31, 1993, pp. 284-302.
Guang X., et al., "A Wire Delay Scalable Stream Processor Architecture," IEEE, Computer Systems Architecture Conference, 13th Asia-Pacific, Aug. 4, 2008, pp. 1-8, XP031321224, Piscataway, NJ, USA, ISBN: 978-1-4244-2682-9.
Hennessy J., et al., "Computer Architecture—A Quantative Approach, Passage," Jan. 1, 2002, pp. 181-187, XP002388271.
Jeong C-H et al., "An Effective Out-Of-Order Execution Control Scheme for an Embedded Floating Point coprocessor," Microprocessors and Microsystems, IPC Business Press Ltd, London, GB, vol. 27 (4), May 20, 2003, pp. 171-180, XP004423866, ISSN: 0141-9331, DOI: 10.1016/S0141-9331(03)00023-1.
Quinones E et al., "Improving Branch Prediction and Predicated Execution in Out-of-Order Processors", High Performance Computer Architecture, 2007. HPCA 2007. IEEE 13th International Symposium on, IEEE, PI, Feb. 1, 2007 (Feb. 1, 2007), pp. 75-84, XP031072896.
International Search Report and Written Opinion—PCT/US2011/044285—ISA/EPO—dated Oct. 13, 2011 (pp. 1-13).

\* cited by examiner

OUT-OF-ORDER COMMAND EXECUTION WITH SLIDING WINDOWS TO MAINTAIN COMPLETION STATUSES

FIELD OF THE INVENTION

This application relates to the processing of commands within a command stream.

BACKGROUND

Advanced multimedia processors use a parallel processing architecture whereby multiple specialized processing pipelines execute the various instructions of a command stream. For example, a multimedia processor may include pipelines for audio processing, data moving, video processing, and 3D graphics processing, which correspond to these media related functions. Due to multitasking and/or multi-threading by the software, as well as programs that may employ multiple media related functions in rapid succession, the command stream for a multimedia processor is an interleaved, ordered combination of the instructions for one or more of the processing pipelines.

Mixed media applications, such as a 3D graphic overlay onto video, often require multiple processing pipelines for efficient execution. In such instances, the multiple processing pipelines required must remain synchronized while concurrently executing in order to achieve the intended mixed media effect. Command dependencies, generated by the processor driver and specifying any commands that must be executed before a particular command may itself execute, designate synchronization issues within the command stream. Because dependencies may traverse multiple pipelines in mixed media applications, inefficiencies result as dependent instructions at the head of a pipeline are blocked to await completion of instructions in another pipeline.

SUMMARY

In general, this disclosure describes techniques for reordering commands to improve the speed at which at least one command stream may execute. Prior to distributing the commands to the pipelines, the multimedia processor analyzes any inter-pipeline dependencies and determines the current command execution progress of the pipelines. The processor may, based on this information, reorder the at least one command stream by prioritizing commands that lack any current dependencies and therefore may be executed immediately by the appropriate pipeline. Such out of order execution of commands within the at least one command stream may increase the throughput of the multimedia processor by increasing the rate at which the at least one command stream is executed.

Preprocessing logic may perform command distribution and synchronization to accomplish command stream reordering. For each pipeline, the preprocessor may maintain a staging area that queues a number of commands for that pipeline. The preprocessor may additionally correlate, in the form of a dependency mask, the dependency information for each command to the execution state of the pipelines. Each command in the staging area for a pipeline may therefore be associated with a separate dependency mask for each of the pipelines. As the multiprocessor executes commands, the preprocessor modifies the dependency masks to reflect the satisfaction of any dependencies on the executed commands. When all dependency masks for a command are cleared, the preprocessor may distribute the command to its appropriate pipeline.

In one example, a method includes receiving at least one command stream that includes inter-command dependency information, wherein the at least one command stream comprises first, second and third commands, wherein the second and third commands have a first order in the at least one command stream such that the second command precedes the third command. The method further comprises determining, based on the inter-command dependency information, that the second command depends upon prior execution of the first command, and determining that the first command is associated with a first one of a plurality of processing pipelines and that the second command and third command are associated with a second, different one of the plurality of processing pipelines. The method further comprises distributing the third command to the second one of the plurality of processing pipelines, and, after distributing the third command to the second one of the plurality of processing pipelines, distributing the second command to the second one of the plurality of processing pipelines such that the second command and third command execute in a second order that is different than the first order.

In another example, an apparatus includes a command distribution and synchronization processor configured to receive at least one command stream that includes inter-command dependency information, wherein the at least one command stream comprises first, second and third commands, wherein the second and third commands have a first order in the at least one command stream such that the second command precedes the third command. The command distribution and synchronization processor is further configured to determine, based on the inter-command dependency information, that the second command depends upon prior execution of the first command, and determine that the first command is associated with a first one of a plurality of processing pipelines and that the second command and third command are associated with a second, different one of the plurality of processing pipelines. The command distribution and synchronization processor is further configured to distribute the third command to the second one of the plurality of processing pipelines, and, after distributing the third command to the second one of the plurality of processing pipelines, distribute the second command to the second one of the plurality of processing pipelines such that the second command and third command execute in a second order that is different than the first order.

In another example, a device includes means for receiving at least one command stream that includes inter-command dependency information, wherein the at least one command stream comprises first, second and third commands, wherein the second and third commands have a first order in the at least one command stream such that the second command precedes the third command. The device further comprises means for determining, based on the inter-command dependency information, that the second command depends upon prior execution of the first command, and means for determining that the first command is associated with a first one of a plurality of processing pipelines and that the second command and third command are associated with a second, different one of the plurality of processing pipelines. The device further comprises means for distributing the third command to the second one of the plurality of processing pipelines, and means for, after distributing the third command to the second one of the plurality of processing pipelines, distributing the second command to the second one of the plurality of processing pipelines such that the second command and third command execute in a second order that is different than the first order.

In another example, a computer-readable storage medium is encoded with instructions for causing a programmable processor to receive at least one command stream that includes inter-command dependency information, wherein the at least one command stream comprises first, second and third commands, wherein the second and third commands have a first order in the at least one command stream such that the second command precedes the third command. The instructions further cause the programmable processor to determine, based on the inter-command dependency information, that the second command depends upon prior execution of the first command, and determine that the first command is associated with a first one of a plurality of processing pipelines and that the second command and third command are associated with a second, different one of the plurality of processing pipelines. The instructions further cause the programmable processor to distribute the third command to the second one of the plurality of processing pipelines, and, after distributing the third command to the second one of the plurality of processing pipelines, distribute the second command to the second one of the plurality of processing pipelines such that the second command and third command execute in a second order that is different than the first order.

The details of one or more aspects are set forth in the accompanying drawings and the description below. Other features, objects, and advantages of the invention will be apparent from the description and drawings, and from the claims.

DETAILED DESCRIPTION

Figure 1:
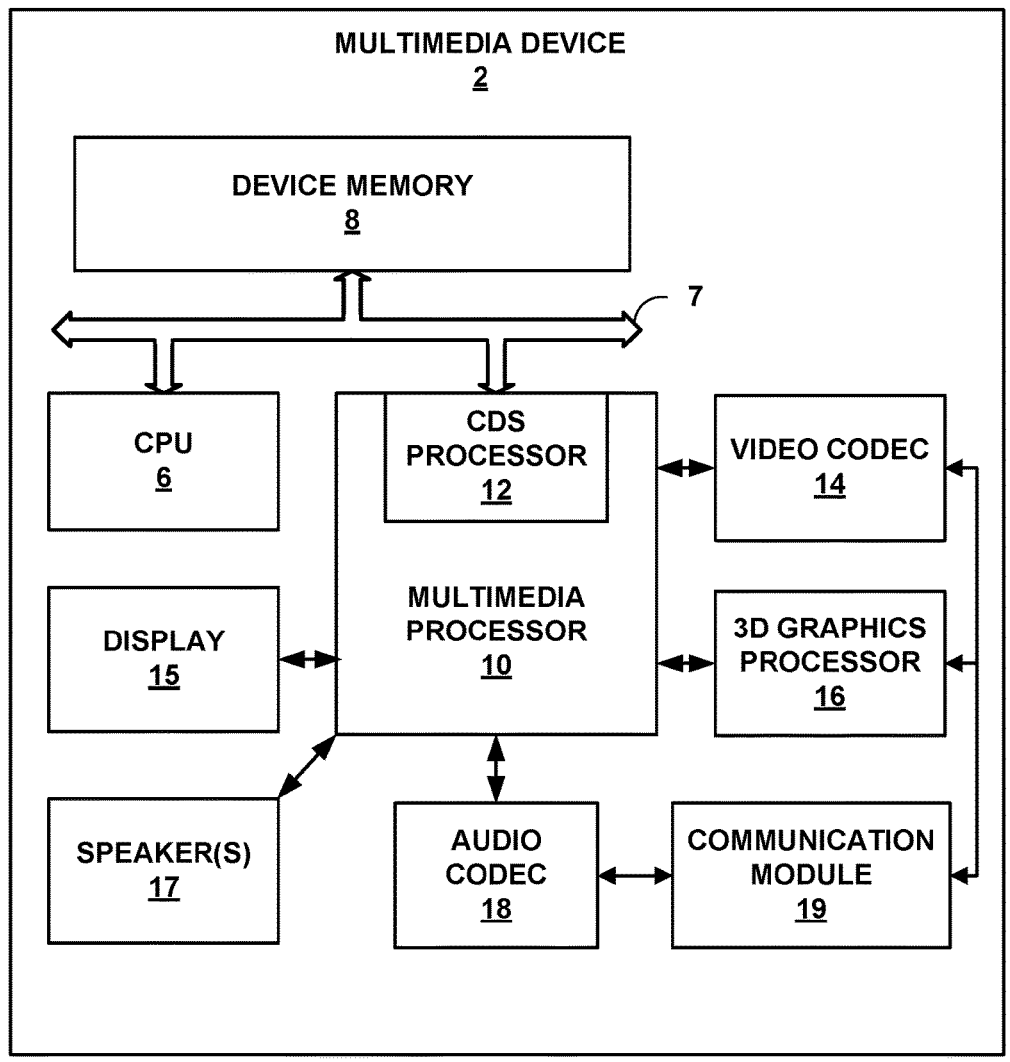
FIG. 1 is a block diagram illustrating an example of a multimedia device that includes a multimedia processor and a command distribution and synchronization processor.

FIG. 1 is a block diagram illustrating components of an exemplary multimedia device 2 that includes a multimedia processor 10 and a command distribution and synchronization processor 12. Multimedia device 2 may comprise a stand-alone device or may be part of a larger system. For example, multimedia device 2 may comprise, or be part of, a wireless media communication device (such as a wireless communication device handset), a digital television (TV), a video telephone, a digital multimedia player, a personal digital assistant (PDA), a video game console, a personal computer or laptop device, or other video device. Multimedia device 2 may also be included within one or more integrated circuits, or chips, which may be used in some or all of the devices described above.

Example multimedia device 2 includes a system bus 7 that couples device memory 8, main processor 6 (illustrated as "CPU 6"), and multimedia processor 10. Device memory 8 may store program instructions and/or data for use by CPU 6 and multimedia processor 10 in executing applications for multimedia device 2. For example, device memory 8 may store compiled instructions for multimedia processor 10 for rendering a graphical scene on a display, as well as storing vertex arrays, textures, display lists, and the like for use in the rendering computations. In some cases, device memory 8 may also include a frame buffer for display 15. Device memory 8 may include a memory controller and may comprise one or more of random access memory (RAM), read-only memory (ROM), non-volatile random access memory (NVRAM), electrically erasable programmable read-only memory (EEPROM), flash memory, and the like.

Main processor 6 controls the operation of multimedia device 2 by executing, for example, an operating system and one or more applications stored in device memory 8. Main processor 6 may execute multiple programs or program threads through multitasking and multithreading methods, which permit main processor 6 to rapidly switch between program or thread contexts. In certain instances, an application executing on main processor 6 may comprise or reference instructions that may be executed by multimedia processor 10. For example, in such instances, main processor 6 may invoke routines of a device driver for multiprocessor 10 stored in device memory 8, where the invoked device driver routines include instructions for execution by multimedia processor 10.

Multimedia processor 10 includes one or more specialized processors that enhance the performance of media related workloads for multimedia device 2, such as video and audio coding/decoding, compression, graphics rendering, video and audio signal processing, and the like. In general, multimedia processors are characterized by high-levels of parallelism and an ability to handle audio and video signals in real-time. Multimedia processor 10 therefore may have multiple media related processing areas dedicated to processing commands associated with particular media related functions of multimedia device 2. Multimedia processor 10 may be present on a card (e.g., video card) for multimedia device 2 and thus separate from main processor 6, though still coupled via system bus 7. In some instances of multimedia device 2, multimedia processor 10 may be embedded with or in main processor 6.

Multimedia device 2 also includes speaker 17 (illustrated as "speakers(s) 17") and display 15, which receive audio or video signals, respectively, from multimedia processor 10 for output to a user (not shown). Speaker 17 may be one or more audio output devices. In some aspects, speaker 17 may be coupled to a speaker controller that generates audio signals based on signals received from multimedia processor 10. Display 15 may be a standard monitor, a television, a mobile device liquid crystal display ("LCD"), or other display device. In some aspects, display 15 may be coupled to a display controller that generates a video signal based on the signals received from multimedia processor 10.

Multimedia device 2 also includes video codec 14, 3D graphics processor 16, and audio codec 18 to convert image, 3D graphics, and audio signals, respectively, for exchange between multimedia processor 10 and communication module 19. Communication module 19 may be a network interface or other component that permits communication (e.g., wireless communication) between multimedia device 2 and other devices.

Multimedia processor 10 may send video, 3D graphics, and/or audio signals to video codec 14, 3D graphics processor 16, and audio codec 18, respectively, for compression and/or encoding prior to transmission by multimedia device 2 of the converted signals to another device via communication module 19. In some aspects, video codec 14, 3D graphics processor 16, and audio codec 18 may send compressed and/or encoded signals to device memory 8 or other storage medium for storage. Multimedia processor 10 may be communicatively coupled to video codec 14, 3D graphics processor 16, and audio codec 18 via one or more communication busses. In some instances, multimedia processor 10, video codec 14, 3D graphics processor 16, and audio codec 18 include custom interfaces for communicating over the one or more communication busses.

Multimedia device 2 may also receive video, 3D graphics, and/or audio signals from other devices via communication module 19. In such instances, communication module 19 may send the received signals to the appropriate one of video codec 14, 3D graphics processor 16, and audio codec 18 for decompression and/or decoding. Video codec 14, 3D graphics processor 16, and audio codec 18 may then send the converted signals to multimedia processor 10 for further processing or to device memory 8 for storage.

Video codec 14, 3D graphics processor 16, and audio codec 18 each may be implemented as one or more microprocessors, digital signal processors (DSPs), application specific integrated circuits (ASICs), field programmable gate arrays (FPGAs), discrete logic, software, hardware, firmware or any combinations thereof. One or more of video codec 14, 3D graphics processor 16, and audio codec 18 may also be integrated as part multimedia processor 10. For example, multimedia processor 10 may be a single processor core that includes video codec 14, 3D graphics processor 16, and audio codec 18. In some instances, 3D graphics processor 16 may comprise a graphics processing unit ("GPU").

Multimedia processor 10 receives commands in the form of a command stream generated by main processor 6. Device memory 8 may store and provide the command stream, when requested, to multimedia processor 10. In some instances, multimedia processor 10 may receive the command stream directly from main processor 6 via system bus 7. The command stream comprises an ordered list of commands (i.e., instructions) for execution by multimedia processor 10. Due to multitasking and/or multithreading by the operating system and programs running on main processor 6, as well as programs that may employ multiple media related functions in quick succession, main processor 6 may generate the command stream as an interleaved combination of command types, where each command type is associated with one of the multiple different media related processing areas of multimedia processor 10.

For example, main processor 6 may invoke a video related subroutine and subsequently invoke an audio related subroutine. If both subroutines are to be executed on multimedia processor 10, the command stream will contain video commands followed by audio commands. The video commands are associated with a video processing area of multimedia processor 10, while the audio commands are associated with an audio processing area of multimedia processor 10.

Frequently, the execution of one or more particular commands in the command stream is a prerequisite to the execution of a later command in the command stream. Thus, there is an inter-command dependency in that the later command depends on one or more preceding commands. In addition to commands, therefore, the command stream includes dependency information for each of the commands. Dependency information maps dependencies for a command by specifying the commands, if any, in the command stream upon which that command depends.

In a mixed media scenario, a command for a particular media related function (e.g., video) may depend upon a command for another media related function (e.g., 3D graphics). Such an inter-function command dependency results in a dependency among the different media related processing areas of multimedia processor 10.

In accordance with the principles described in this disclosure, multimedia processor 10 contains command distribution and synchronization processor 12 ("CDS processor 12"), which efficiently distributes each command in the command stream to the associated media related processing area of multimedia processor 10.

As described in detail below, CDS processor 12 distributes commands to the different media related processing areas of multimedia processor 10 by analyzing the dependency information for commands in the command stream, determining whether the dependencies for the commands have been satisfied (i.e., executed) and, if so, reordering the command stream to promptly execute commands for which dependencies have been satisfied. CDS processor 12, in doing so, respects the synchronization requirements specified by the dependency information. By distributing and synchronizing commands in this manner, CDS processor 12 enables multiprocessor 10 to achieve a higher command execution rate.

The techniques described herein may have certain advantages. For example, resource-dependent instructions may have high latencies that cause long pipeline blocks that affect all instructions that are subsequent to the resource-dependent instructions in the command stream order. By distributing and synchronizing commands in the manner described, CDS processor 12 may avoid blocking the affected instructions by executing the affected instructions prior to the resource-dependent instructions. Increasing the pipeline throughput in this manner tends to increase the general execution rate of the entire command stream, thereby enabling multimedia processor 10 to achieve a higher command execution rate.

Figure 2:
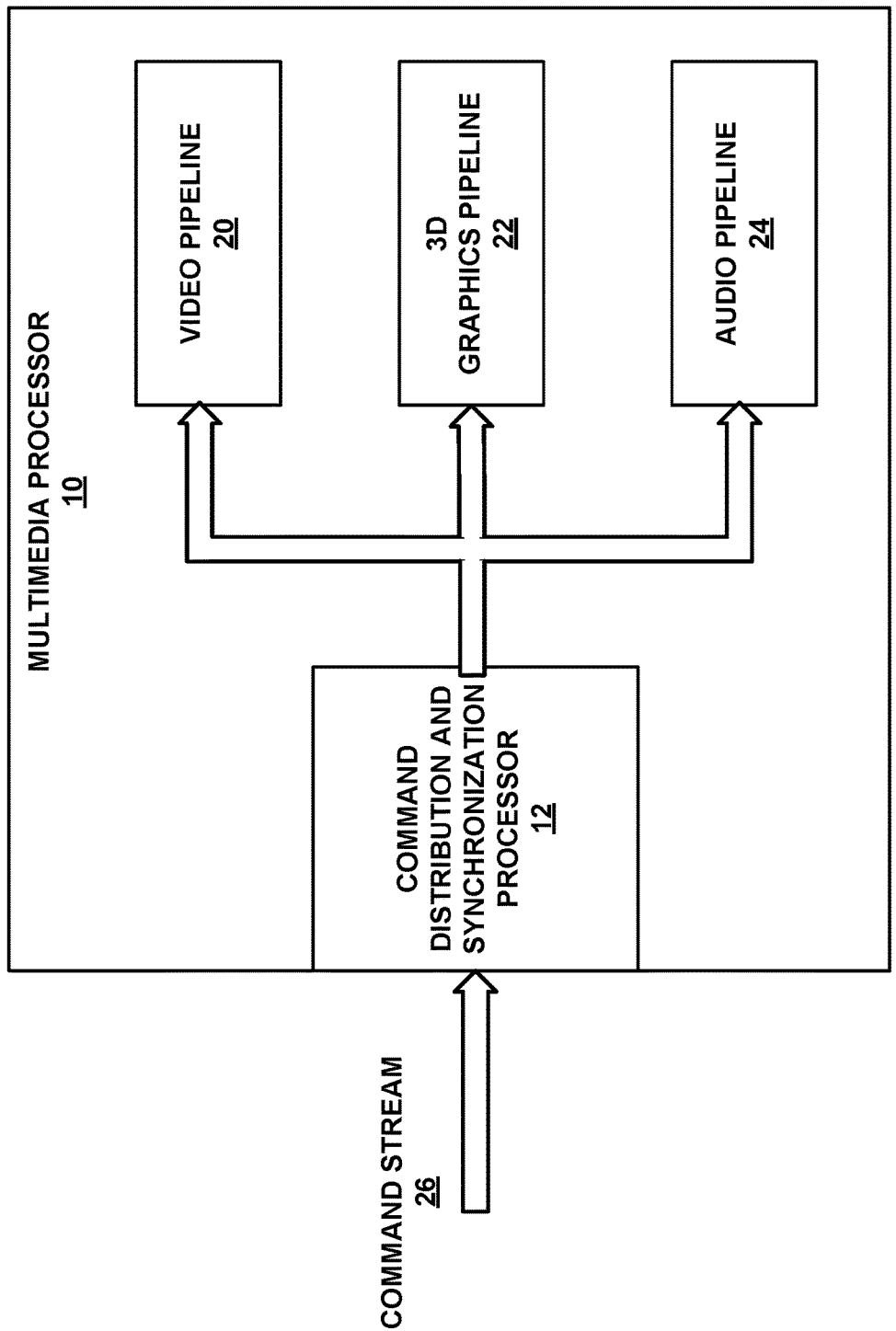
FIG. 2 is a block diagram illustrating an exemplary multimedia processor having a command distribution and synchronization processor that implements command stream reordering in a manner consistent with the principles described herein.

FIG. 2 is a block diagram illustrating an example multimedia processor 10 that is configured in accordance with the techniques of this disclosure. The media related processing areas for multimedia processor 12 include instruction pipelines in the form of video pipeline 20, 3D graphics pipeline 22, and audio pipeline 24. The command pipelines tend to increase the command throughput by dividing command processing into multiple stages, with each stage performing one aspect of the process required to execute any particular command. In some instances, multimedia processor 10 may have additional pipelines that are associated with various other media related functions or that duplicate one or more of the illustrated pipelines (e.g., video pipeline 20). In some instances, multimedia processor 12 may have fewer pipelines, or may use non-pipeline-based logic for executing commands.

Command stream 26 is a list or sequence of commands for execution by multimedia processor 10. Each command in the command stream is associated with a particular pipeline of multimedia processor 12. In the example of multimedia processor 10, commands of type video are associated with video pipeline 20. Likewise, 3D graphics commands are associated with 3D graphics pipeline 22. Finally, audio commands are associated with audio pipeline 24.

Command stream 26 is ordered, that is, each command in command stream 26 is preceded by all commands on which the command is dependent. As described above, command stream 26 may be an interleaved combination of sets of commands for various command types (e.g., video, audio, 3D graphics). A set is a collection of zero or more commands. For example, commands in a set of video commands may be interleaved in command stream 26 with commands in a set of audio commands. In some examples, command stream 26 represents a plurality of command sub-streams that each correspond to one of the plurality of command types and comprise a set of commands for the corresponding command type. That is, in these examples, command stream 26 would not be interleaved as shown. In these examples, multiprocessor 10 may process the sub-streams concurrently. The sub-streams may have differing associated priorities such that multiprocessor 10 processes the sub-streams in accordance with the relative priority values. Multiprocessor 10 may also read one sub-stream more often or frequently than another sub-stream based upon the priorities that are associated with these sub-streams. The commands in each of the sub-streams may still have unique identifiers, such that commands in one sub-stream can depend on commands in another sub-stream. In general, multiprocessor 10 is capable of processing one or more streams, including sub-streams, of commands. A command in any given stream may depend upon a command in the same or in another stream.

In addition to commands, command stream 26 may include, for each command, a dependency list of arbitrary length that specifies the commands, if any, in command stream 26 upon which that command depends. Commands upon which another command depends are referred to hereinafter as dependencies. The dependency list for a particular command in command stream 26 may specify dependencies that have a type different than that of the particular command. For example, a video command may have dependencies that are of type 3D graphics.

Because completion of the execution of a command in a pipeline frequently depends not only on other commands, but on the responsiveness of various device resources (e.g., device memory), the rate at which a command is executed is nondeterministic. For example, video pipeline 20 may experience a collision over a system resource with another pipeline, or with another component of device 2 of FIG. 1 (e.g., main processor 6). In such instances, video pipeline 20 may be forced into a wait state until the system resource again becomes available. From the perspective of multimedia processor 10, the execution time for each command in command stream 26 may therefore be nondeterministic and may not be determined until run-time. The ordering of command stream 26 as it reaches multimedia processor 10 may be suboptimal, as dependencies for a command may be in a wait state while other, subsequent commands in command stream 26 may have their dependencies satisfied and be ready for execution in one of the multimedia processor 10 pipelines.

To increase the rate at which the commands of command stream 26 are executed, example multimedia processor 10 further includes command distribution and synchronization processor 12 ("CDS processor 12"), which receives commands within command stream 26 for multimedia processor 10 and efficiently distributes commands to video pipeline 20, 3D graphics pipeline 22, and audio pipeline 24. CDS processor 12 may, in some cases, be implemented as one or more microprocessors, application specific integrated circuits (ASICs), field programmable gate arrays (FPGAs), discrete logic, software, hardware, firmware or any combinations thereof. In various aspects, CDS processor 12 is implemented as a component separate from multimedia processor 10, for example, as a separate central processing unit, microprocessor, or DSP.

Consistent with the principles of this disclosure, CDS processor 12 may reorder the commands of command stream 26 prior to distributing them to video pipeline 20, 3D graphics pipeline 22, and audio pipeline 24. CDS processor 12 reorders the commands by analyzing the execution status for commands previously distributed to the pipelines and compares this status to the dependency information for commands that have yet to be distributed to the pipelines for execution. When a command for a particular command type has unsatisfied dependencies in one or more of the pipelines, CDS processor 12 may prioritize for distribution other, subsequent commands of that command type from command stream 26. CDS processor 12 in effect reorders command stream 26, permitting certain commands to execute out of order, while respecting the synchronization requirements specified by the dependency information of command stream 26.

Figure 3:
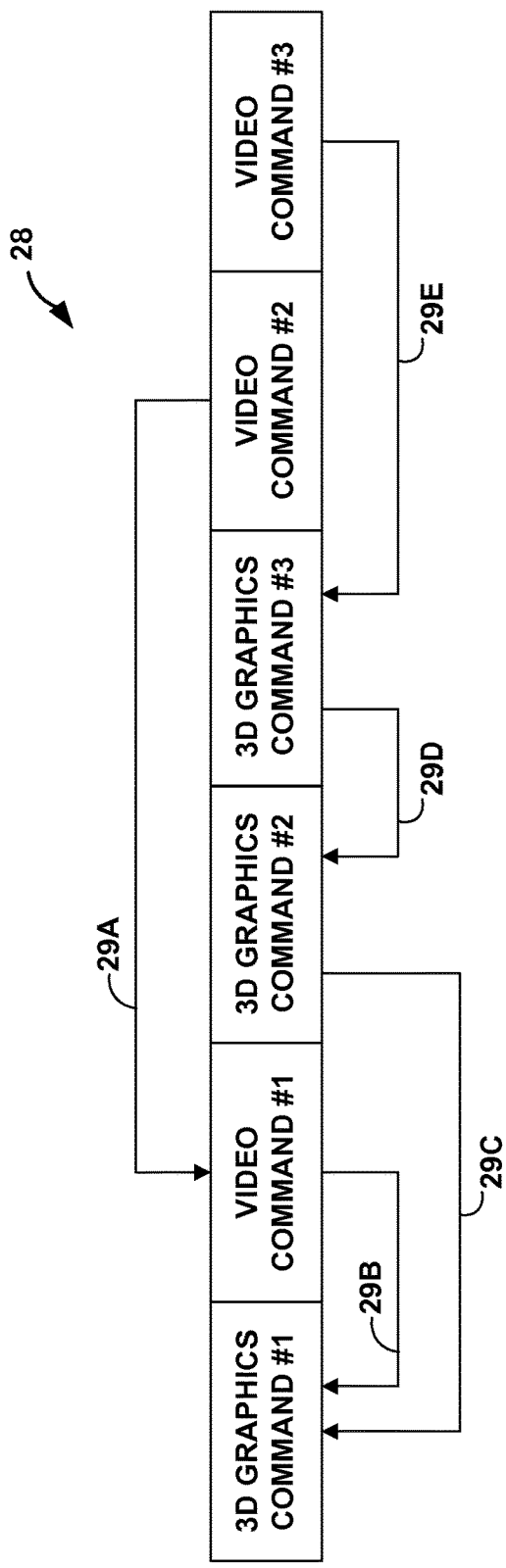
FIG. 3 is a block diagram illustrating an example of a subset of a command stream having interleaved instructions for multiple processing pipelines.

FIG. 3 illustrates commands 28, an exemplary subset of command stream 26 of FIG. 2. Commands 28 is interleaved with six commands, in intended execution order from left to right, each having one of two types: video or 3D graphics. A command may depend upon any other command that precedes it in command stream 26. Certain of commands 28 have dependencies illustrated by dependency arrows 29A-29E (collectively, "dependencies 29"). For example, dependency arrow 29D illustrates 3D graphics command #3 being dependent upon 3D graphics command #2. In some instances, a command having one type may depend upon a command having another type. For example, dependency arrow 29B illustrates video command #1 being dependent upon 3D graphics command #1. Because command stream 26 is ordered, commands cannot be dependent upon subsequent commands.

Figure 4:
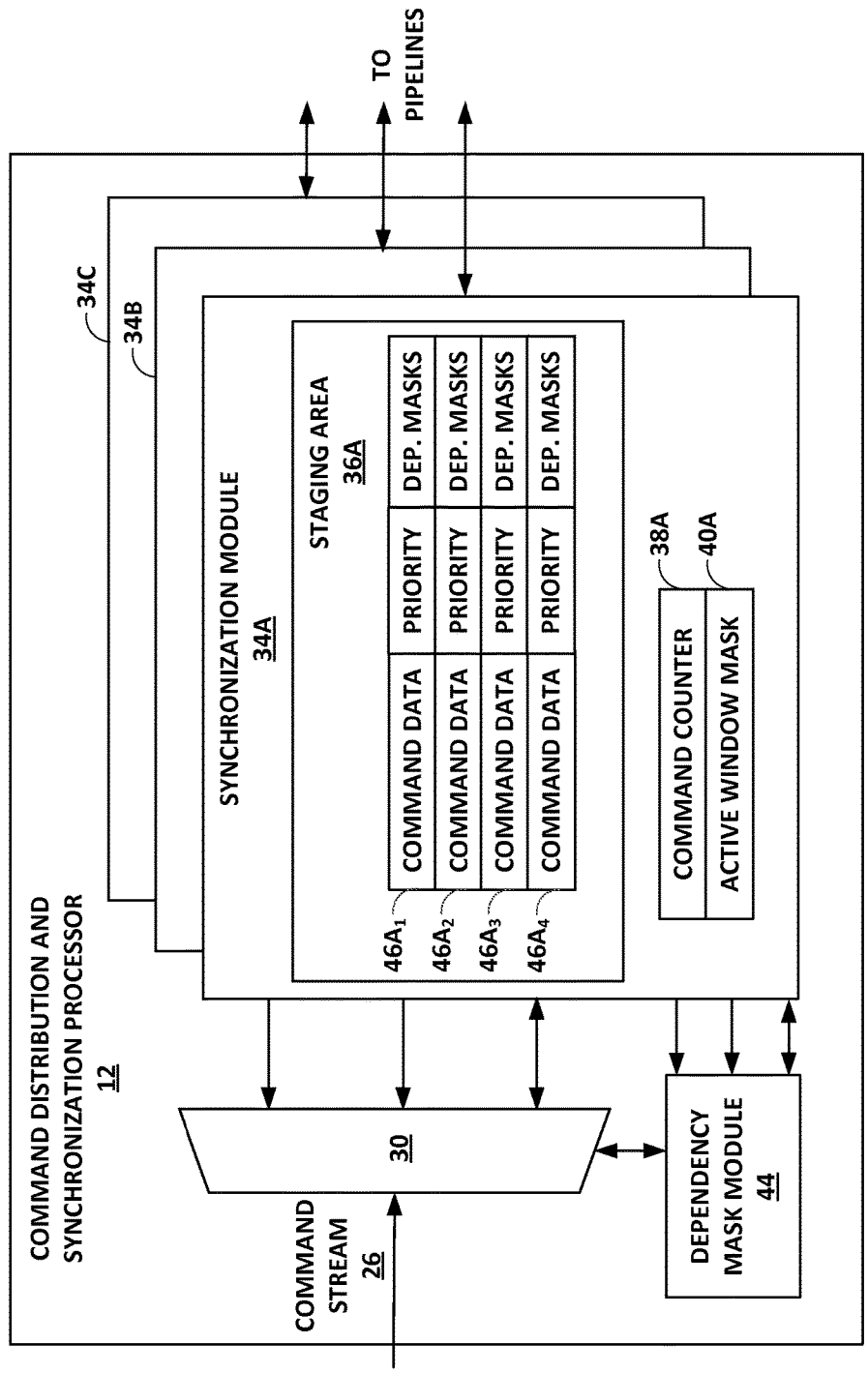
FIG. 4 is a block diagram illustrating an exemplary command distribution and synchronization block consistent with this disclosure.

FIG. 4 is a block diagram illustrating, in greater detail, the exemplary CDS processor 12 of FIG. 2. CDS processor 12 includes distribution module 30, which receives command stream 26 and distributes the commands therein to one of synchronization modules 34A-34C based on the command type (collectively, "synchronization modules 34"). For example, distribution module 30 distributes audio commands to the one of synchronization modules that is associated with the audio command type.

Synchronization modules 34 perform the command reordering functions described herein, for each of the associate command types, in conjunction with distribution module 30 and dependency mask module 44. Each of synchronization modules 34 is associated with a particular command type and thus a particular pipeline of multimedia processor 10. For example, synchronization module 34A may be associated with video commands and may therefore also be associated with video pipeline 20 (not shown in FIG. 4). In various aspects, depending on the number of pipelines, a CDS processor 12 may have more or fewer synchronization modules. In the example of FIG. 4, synchronization modules 34 are substantially similar, though for simplicity synchronization module 34A is shown in greater detail than synchronization modules 30B-30C.

As distribution module 30 distributes commands to synchronization modules 34, distribution module 30 effectively demultiplexes interleaved command stream 26 into three command-type specific streams each associated with a particular one of synchronization modules 34. Thus, for example, distribution module 30 generates a command-type specific command stream that contains commands having the type associated with synchronization module 34A (i.e., video commands). Each command-type specific command stream retains the order in which the commands appear in command stream 26. In embodiments in which command stream 26 represents a plurality of command sub-streams that each correspond to one of the plurality of command types, distribution module 30 may distribute commands in each sub-stream corresponding to a command type to the associated one of synchronization modules 34 for that command type.

Synchronization module 34A includes staging area 36A, command counter 38A, and active window mask 40A, which synchronization module 34A uses to analyze inter-command dependency information and reorder commands based on the results of the analysis. Staging area 36A includes registers that store command information, which includes command data and priority information received from distribution module 30 as well as dependency masks. Staging area 36A includes a defined number of slots $46A_1$-$46A_4$ (collectively, "slots 46A"), with each of slots 46A storing command information for a particular command.

In various aspects, a synchronization module 34 may include a staging area 36 having more or fewer slots than staging area 36A of synchronization module 34A. That is, a staging area 36 is not limited to four slots. In some aspects, different ones of synchronization modules 34 may have varying number of slots. For example, a synchronization module 34A may have four slots, while a synchronization module 34B may have eight slots. In some aspects, the number of slots for a synchronization module 34 is variable in order to optimize performance for certain applications of CDS processor 12.

Synchronization module 34A transfers the command at the head of the type-specific command stream generated by distribution module 30 into an available one of slots 46A. If none of slots 46A are available, synchronization module 34A may block the type-specific command stream until one of slots 46A becomes available. As described in detail below, synchronization module 34A then reorders the execution order of commands in slots 46A of staging area 36 based on a dependency analysis. Where commands stored by staging area 36 have their dependencies satisfied, synchronization module 34A sends those commands to the associated pipeline (i.e., video pipeline 20) for execution. Because each command in the type-specific command stream may, in theory, depend upon any other command that preceded the command in command stream 26, synchronization module 34A stores completion information for every command that synchronization module 34A receives and offloads for execution.

While completion information may be potentially voluminous due to the requirement of storing completion information for every previously executed command, command counter 38A and active window mask 40A compress the completion information into two values. The values of command counter 38A and active window mask 40A define a "sliding window" that maintains command completion information for the commands associated with synchronization module 34A (i.e., video commands). First, command counter 38A defines the starting position of the sliding window, which corresponds to the number of commands in the type-specific command stream for which no previous command remains unexecuted. That is, counting from the first command in the type-specific command stream, the number of commands counted before reaching an unexecuted command. All dependencies referencing a command having a command count less than command counter 38A have been executed and are therefore satisfied.

In addition, the number of slots 46A in staging area 36A defines the size of the sliding window. In the example of FIG. 4, there are four slots 46A in staging area 36A. The sliding window for synchronization module 34A therefore encompasses four commands in this example, which correspond to the four commands held by slots 46A. Because command counter 38A defines the starting position of the sliding window at the command count for the latest command in the type-specific command stream for which there are no previously unexecuted commands, the sliding window encompasses those commands that immediate follow that latest command. Slot $46A_1$ holds the first command in the sliding window, slot $46A_2$ holds the second command, and so on. In some aspects, slots 46A may hold commands in a non-sequential order and additional logic maps the commands to the various slots.

Command reordering by synchronization module 34A may result in some commands held by slots 46A being executed out of order. For instance, the command held by slot $46A_2$, which follows the command held by slot $46A_1$ in command stream 26, may nevertheless execute earlier. To enable synchronization module 34A to determine whether commands that are dependent upon the commands encompassed by the sliding window, active window mask 40A tracks the completion information for the commands in staging area 36A. Active window mask 40A has a bit length equal to the sliding window size. This equates to one bit for each command held by slots 46A in staging area 36A. The least significant bit ("LSB") of active window mask 40A indicates the completion status for the command held by slot $46A_1$. The next-least significant bit indicates the completion status for the command held by slot $46A_2$, and so on. A bit value of "1" indicates that the corresponding command has been executed.

For example, assume slots $46A_1$-$46A_4$ hold video commands #10, #11, #12, and #13, respectively. As described above, the sliding window defined by command counter 38A and active window mask 40A tracks the completion of all commands that are or have previously been within the ambit of synchronization module 34A. In this example, command counter 38A will have a value of 10, for that is the number of commands in the type-specific command stream for which no previous command remains unexecuted (i.e., video commands #0-#9). Assume further that video command #11 and video command #12 have been executed, while video command #10 and video command #13 have not been executed. Accordingly, active window mask 40A has a mask value of 0x6, or in a binary representation, a mask value of 0110b.

Completion of video command #10 empties slot $46A_1$. As a result, synchronization module 34A advances video commands #11, #12, and #13 to slots 46A$_1$-46$_3$ and transfers video command #14 (currently at the head of the type-specific command stream generated by distribution module 30) to newly emptied slot 46A$_4$. In addition, synchronization module 34A advances the sliding window by changing the values in command counter 38A and active window mask 40A. In particular, command counter 38A receives a value of eleven, while active window mask receives a mask value of 0x3 (binary 0011b) in order to indicate that video commands #11 and #12 have executed, while video commands #13 and #14 have not yet executed.

In some aspects, slots 46A may hold commands in a non-sequential order and additional logic maps the commands to the various slots. In such aspects, synchronization module 34A need not advance commands in order to open slot 46A$_4$, and the mapping ensures that the bit places of active window mask 40A remains consistent with the corresponding commands.

The techniques described above with respect to synchronization module 34A may similarly apply to synchronization modules 34B-34C. As a result, synchronization modules 34 maintain command completion information for each of the three type-specific command streams generated by distribution module 30. In this example, synchronization module 34A maintains command completion information for video commands associated with video pipeline 20. Synchronization module 34B maintains command completion information for 3D graphics commands associated with 3D graphics pipeline 22. Finally, synchronization module 34C maintains command completion information for audio commands associated with audio pipeline 24.

CDS processor 12 further includes dependency mask module 44 to generate and maintain dependency masks to represent the dependencies for commands held by slots 46A in staging area 36A. Because commands in command stream 26 having a particular command type may depend upon one or more other commands of any command type, each command is associated with one dependency mask for each of the command types. As a result, slots 46A hold dependency masks for each of synchronization modules 34. In the example of FIG. 4, each command in one of slots 46A is associated with three dependency masksone for each of synchronization modules 34.

Every dependency mask for a command therefore corresponds to one of synchronization modules 34. A dependency mask may have a bit length equal to the bit length of the active window mask of the corresponding one of synchronization modules 34. This equates to one bit for each command held by slots 46 in staging area 36 of the corresponding one of synchronization modules 34. A bit value of "1" in a dependency mask indicates a dependency upon a corresponding command held by one of slots 46.

For a command associated with a dependency mask that corresponds to synchronization module 34A, for example, the dependency mask has a bit length of four, equal to the bit length of active window mask 40A and the number of slots 46A in staging area 36A. The LSB of the dependency mask indicates the dependency relation of the command associated with the dependency mask and the command held by slot 46A$_1$. The next-least significant bit of the dependency mask indicates the dependency relation of the command associated with the dependency mask and the command held by slot 46A$_2$, and so on. For instance, if the dependency mask has a value of 0x9 (binary 1001b), the associated command for the dependency mask depends upon the commands held by slots 46A$_1$ and 46A$_4$.

Dependency mask module 44 generates dependency masks for every command as the commands enter a staging area 36 for one of synchronization modules 34. In some aspects, a software driver or other logic external to CDS processor 12 performs the functions of dependency mask module 44. With reference to synchronization module 34A, when one of slots 46A becomes available after the sliding window for synchronization module 34A advances, synchronization module 34A may transfer the command at the head of the type-specific command stream to an available one of slots 46A (e.g., slot 46A$_4$) in staging area 36A. As described above, the command stream further provides a dependency list for that command. The dependency list specifies the other commands, if any, in command stream 26 upon which that command depends. Entries in the dependency list reference a command in a type-specific command stream by command count value, which represents the number of previous commands in the type-specific command stream for the command. For instance, video command #0 is the first video command in the video command stream, video command #1 is the second video command in the video command stream, and so on.

Dependency mask module 44 receives dependency lists from distribution module 30 for commands to be transferred by synchronization module 34A to staging area 36A. For each command, dependency mask module 44 compares each entry in the associated dependency list with the sliding window defined by the command counter 38 and active window mask 40 for each of synchronization modules 34. If the dependency entry references a command having a command count value that is less than the value of the command counter 38 of the one of synchronization modules 34 associated with the referenced command, then the dependency is satisfied because the referenced command has already executed.

If, by contrast, the dependency entry references a command that is currently held by a staging area 36 for one of synchronization modules 34, the referenced command is within the sliding window for that one of synchronization modules 34. Dependency mask module 44 therefore evaluates the active window mask 40 for that one of synchronization modules 34 in order to determine whether the referenced command has executed. If the referenced command has not yet executed, then, for the appropriate dependency mask, dependency mask module 44 places a "1" bit in the bit place that corresponds the one of slots 46 that holds the referenced command. As a result, the dependency mask indicates that the dependency remains unsatisfied.

For example, with reference to synchronization module 34A, if a dependency entry references the command held by slot 46A$_2$ and active window mask 40A has a value of "1" in the bit place that corresponds to slot 46A$_2$, then dependency mask module 44 places a "1" bit in the bit place that corresponds to slot 46A$_2$ in the dependency mask associated with synchronization module 34A. A command held by one of slots 46A that has one or more dependency masks with non-zero values may not be executed until the remaining one or more dependencies for the command are executed.

In some instances, the dependency entry for an incoming command references another command that is beyond the sliding window for the appropriate one of synchronization modules 34. That is, a referenced command that has neither executed nor that falls within the sliding window. In such instances, dependency mask module 44 directs the synchronization module 34 associated with the incoming command to block, that is, to postpone transferring the incoming command at the head of the type-specific command stream to staging area 36. A blocking one of synchronization modules 34 will unblock once a sufficient number of commands execute to advance the sliding window to encompass the referenced command.

Dependency mask module 44 evaluates each of the referenced commands in the dependency list for an incoming command in the manner described above and thereby generates dependency masks for the incoming command for each of synchronization modules 34. Upon generating the dependency masks, dependency mask module 44 sends the dependency masks to the associated one of synchronization modules 34 that will hold the incoming command in a staging area 36. The associated one of synchronization modules 34 confirms the transfer of the incoming command from the head of the type-specific command stream in distribution module 30 to one of slots 46 in staging area 36.

Video pipeline 20, 3D graphics pipeline 22, and audio pipeline 24 report the completion of commands to the respective, associated synchronization modules 34. A synchronization module 34, e.g., synchronization module 34A, upon receiving a command completion indication from an associated pipeline, determines the one of slots 46A that holds the completed command and the bit place corresponding to that slot. Synchronization module 34A then updates the sliding window by modifying active window mask 40A to set the bit (i.e., change the bit value to "1") at the bit place that corresponds to the completed command. In addition, synchronization module 34A notifies the dependency mask module 44 of the command completion and provides the bit place value. The notification may comprise a signal, a data structure, a message, a bitmask, a value, or another mechanism. Every command held by synchronization modules 34 has an associated dependency mask that corresponds to synchronization module 34A. Therefore, upon receiving the notification, dependency mask module 44 modifies all of the dependency masks within each of the synchronization modules 34A-34C that correspond to synchronization module 34A in order to clear (i.e., set to a "0" value) the bits in the appropriate bit place. Clearing the bits in the appropriate bit place signifies the satisfaction of any dependencies related to the command corresponding to that bit place.

When the completed command corresponds to the LSB of the active window mask 40 for the associated one of synchronization modules 34, the associated synchronization module 34 advances the sliding window by incrementing command counter 38 and right-shifting active window mask 40 by one bit (right-shifting sets the most significant bit of active window mask 40 to zero). Because the active window mask 40 right-shifts by one bit, dependency mask module 44 likewise right-shifts by one bit all of the dependency masks corresponding to the associated synchronization module 34. In this way, the bits values in the bit places for the dependency masks remain consistent with the locations of the commands in the sliding window for the associated synchronization module 34.

As a consequence of the processes described above, the dependency masks, for each command, accurately represent the dependency completion status for the command. When every dependency mask for a command is cleared (i.e., has a bit-value of zero), the command has no remaining, unsatisfied dependencies. Accordingly, the one of synchronization modules 34 associated with the command transfers the command to the appropriate pipeline for execution.

A command completion may result in dependency mask module 44 clearing dependency masks for more than one command in a particular staging area 36 being cleared. In such instances, both commands are ready for execution.

Commands in command stream 26 are associated with priority information that distribution module 30 transfers to a synchronization module 34 together with command data. Priority information is a number or other identifier that specifies the relative priority of a particular command as compared to the priority of any other command. The staging area 36 for a synchronization module 34 maintains priority information. With reference to synchronization module 34A, for example, staging area 36A maintains the associated priority information for a command in slots 46A. Thus, each of slots 46A holds, for a particular command, command data, priority information for the command, and the dependency masks for the command. Priority information may relate to the application running on multimedia device 2 that includes the associated command, the type of command (e.g., resource dependent, complex), or other factors.

When two or more commands in synchronization module 34A are ready for execution, the relative priority of the commands determines the execution order. A higher priority command has execution precedence. If the relative priority for the commands is equal, synchronization module 34A may use another method to determine precedence (e.g., round-robin, random selection, first-in-first-out (FIFO)).

A certain command may have no dependencies or may have dependencies that are satisfied earlier than the dependencies for other commands that precede the command in command stream 26. Use of synchronization modules 34 permits CDS processor 12 to execute the command upon satisfaction of the command dependencies, rather than blocking the command until the preceding commands themselves execute. Consequently, commands in command stream 26 may be executed out of order, resulting in a higher overall execution rate for command stream 26.

Figure 5:
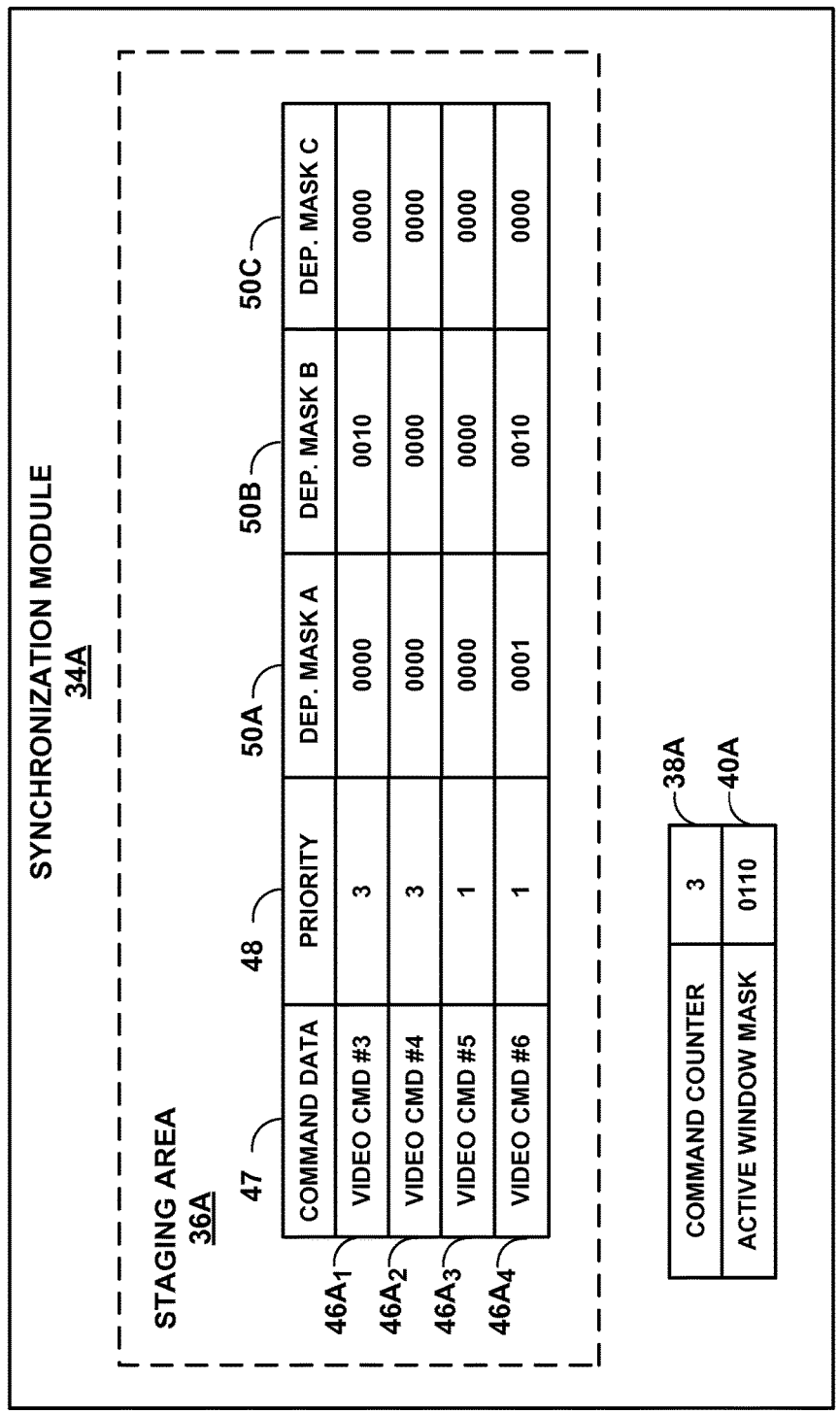
FIG. 5 is a block diagram illustrating an exemplary synchronization module, consistent with this disclosure, at a particular operational state.

FIG. 5 is a block diagram showing one example of synchronization module 34A of FIG. 4 in greater detail and at a particular operational state. FIG. 5 expands the depiction of slots 46A to illustrate command data column 47, priority column 48, and dependency mask columns 50A-50C for slots $46A_1$-$46A_4$, as well as to provide examples of possible values for these various columns in slots 46A. Dependency mask columns 50A-50C corresponds to synchronization modules 34A-34C of CDS processor 12 of FIG. 4. Thus, for example, the dependency masks in dependency column 50A correspond to commands held by synchronization module 34A.

In the illustrated operational state, slots $46A_1$-$46A_4$ hold video commands #3-#6, respectively. The dependency mask B (dependency mask column 50B) for slot $46A_1$ holding video command #3 has the value 0010b. Because the second bit place has a "1" value, this denotes a dependency upon the corresponding second command in the second slot of staging area 36B of synchronization module 34B. As another example, the dependency mask A (dependency mask column 50A) for slot $46A_4$ holding video command #6 has the value 0001b. This denotes a dependency upon the command in slot $46A_1$ of synchronization module 34A (i.e., video command #3).

Command counter 38A and active window mask 40A represent the sliding window state for synchronization module 34A. The value of command counter 38A indicates that video pipeline 20 has completed the first three video commands. The value of active window mask 40A indicates that video pipeline 20, which is associated with synchronization module 34A, has additionally completed the commands in slots $46A_2$ and $46A_3$ (i.e., video command #4 and video command #5).

Priority column 48 specifies the priority of the commands in slots 46A. As described above, when two or more commands in a synchronization module 34 become ready for execution at a similar time (such as by having their dependencies cleared), the command with the higher relative priority has execution precedence. For example, video command #6 with a priority value of one has a higher relative priority than video command #3 with a priority value of three.

Figure 6:
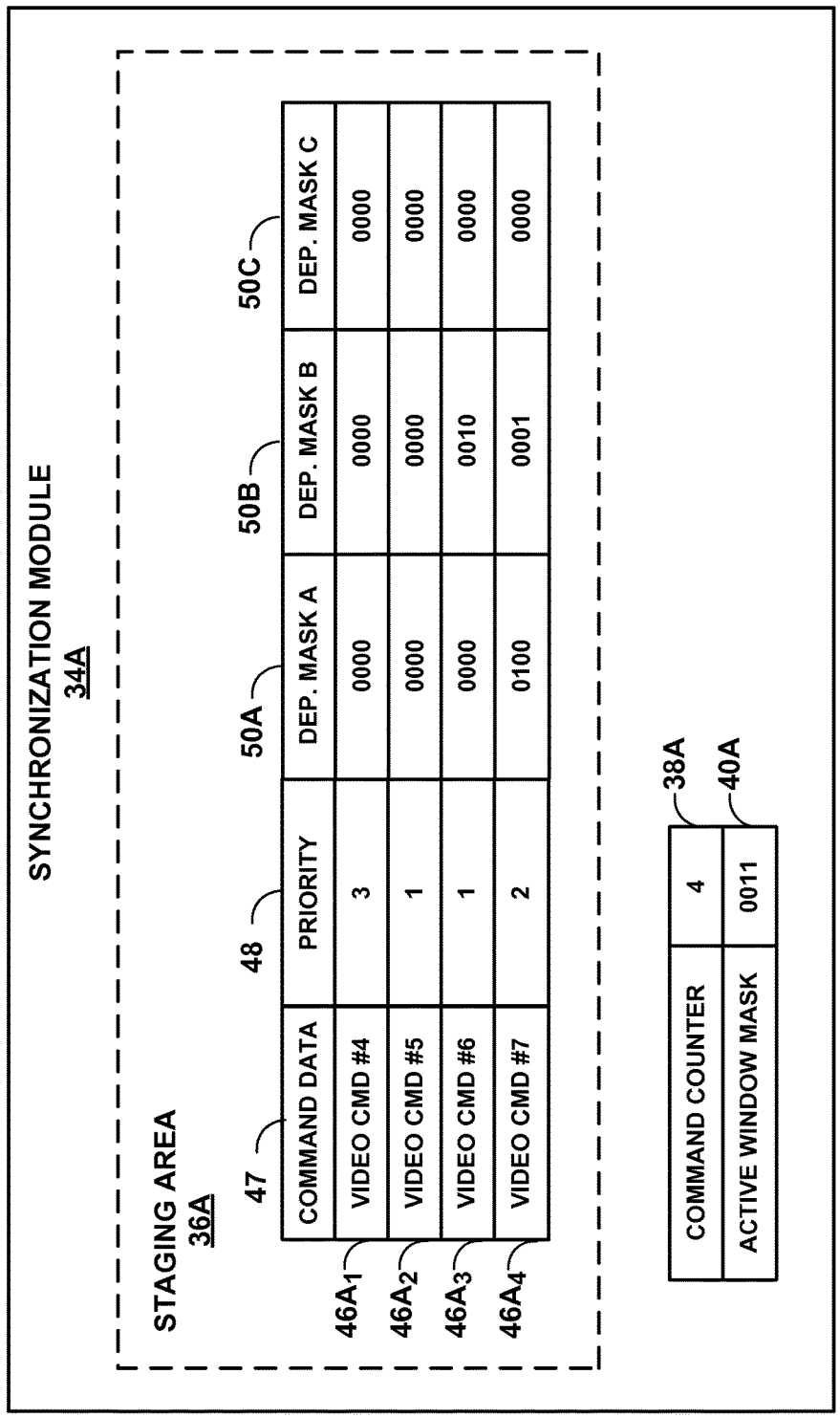
FIG. 6 is a block diagram illustrating the synchronization module of FIG. 5 at a future operational state.

FIG. 6 is a block diagram illustrating synchronization module 34A of FIG. 5 at a future operational state, after execution by video pipeline 20 of video command #3. Synchronization module 34A, in response to the execution of video command #3, transferred the command at the head of the type-specific command stream, video command #3, to slot 46A$_4$ after advancing the other commands in the slots. In addition, synchronization module 34A advanced the sliding window by incrementing command counter 38A and right-shifting active window mask 40A by one bit.

Finally, because video command #3 in FIG. 5 corresponded to the LSB of the active window mask 40A, dependency mask module 44 right-shifted all dependency masks A (dependency mask column 50A) by one bit. As a consequence, the dependency mask A for video command #6 is cleared. However, because the dependency mask corresponding to synchronization module 34B (dependency mask column 50B) for video command #6 still specifies a dependency, video command #6 may not yet be transferred to video pipeline 20 for execution.

Figure 7:
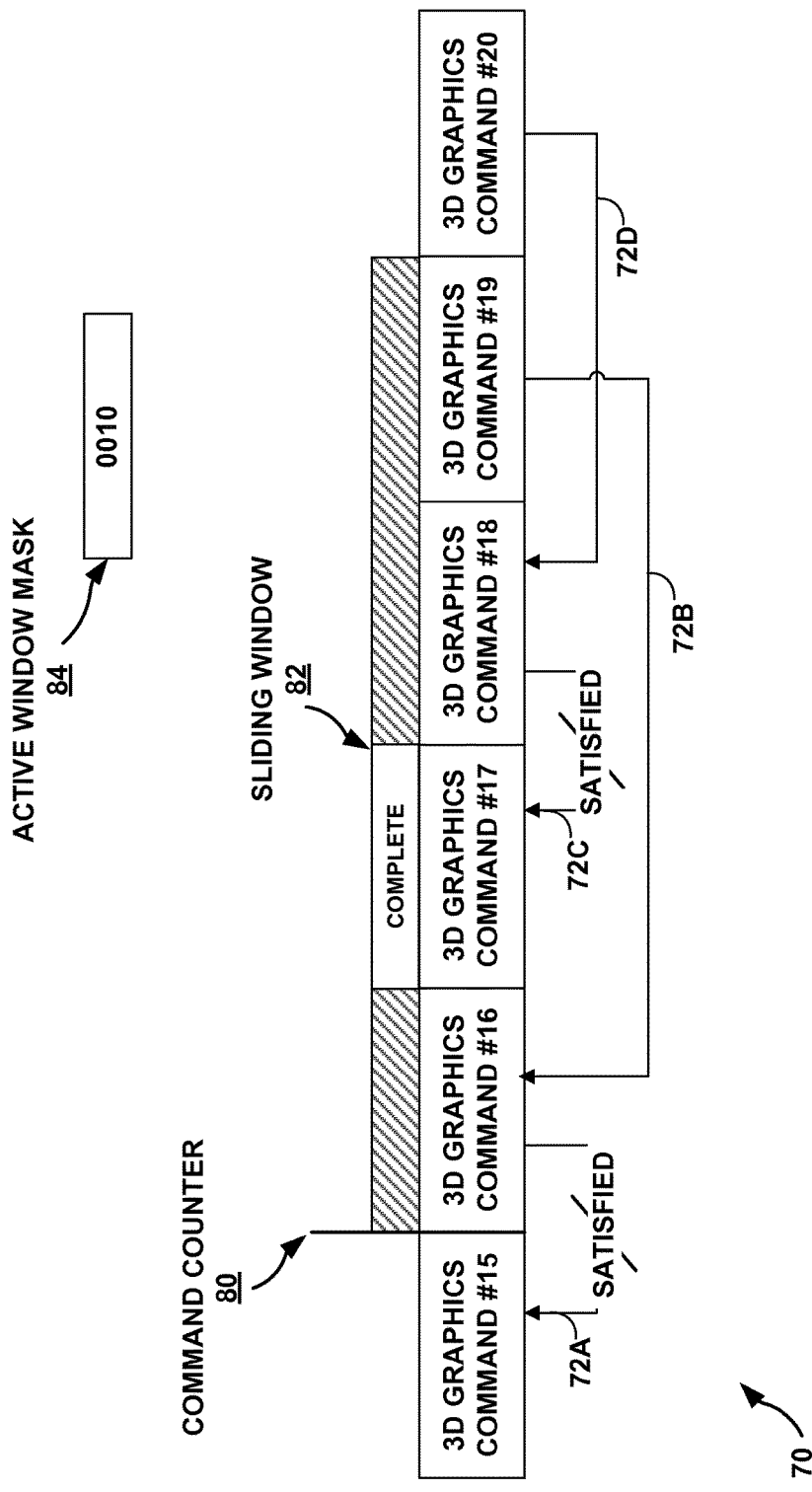
FIG. 7 is a block diagram illustrating an exemplary subset of a type-specific command stream and an exemplary sliding window for the type-specific command stream.

FIG. 7 is a block diagram illustrating commands 70, a subset of a type-specific command stream and an exemplary sliding window for the type-specific command stream. Commands 70 are 3D graphics commands. Dependencies 72A-72D illustrate various inter-command dependencies. For example, dependency 72A denotes a dependency of 3D graphics command #16 upon 3D graphics command #15. Command counter 80 shows the start location of sliding window 82. In this example, command counter 80 has a value of 16, which indicates the completion, by a 3D graphics pipeline associated with 3D graphics commands (not shown in FIG. 7), of the first 16 3D graphics commands in the 3D graphics command stream. Because the value of command counter 80 is greater than the command count for 3D graphics command #15, dependency 72A is satisfied.

Sliding window 82 encompasses the four commands following command counter 80. Accordingly, slots in an associated synchronization module hold 3D graphics command #15-#19 (not shown in FIG. 7). Sliding window 82 shows that graphics command #17 is the only command in the sliding window that has been completed. The execution status of the earliest command encompassed by the sliding window (in this example, 3D graphics command #15) is represented by the LSB of active window mask 84. Active window mask 84, which represents sliding window 82 in the synchronization module associated with 3D graphics commands (not shown in FIG. 7), therefore has a value of 0010b.

Figure 8:
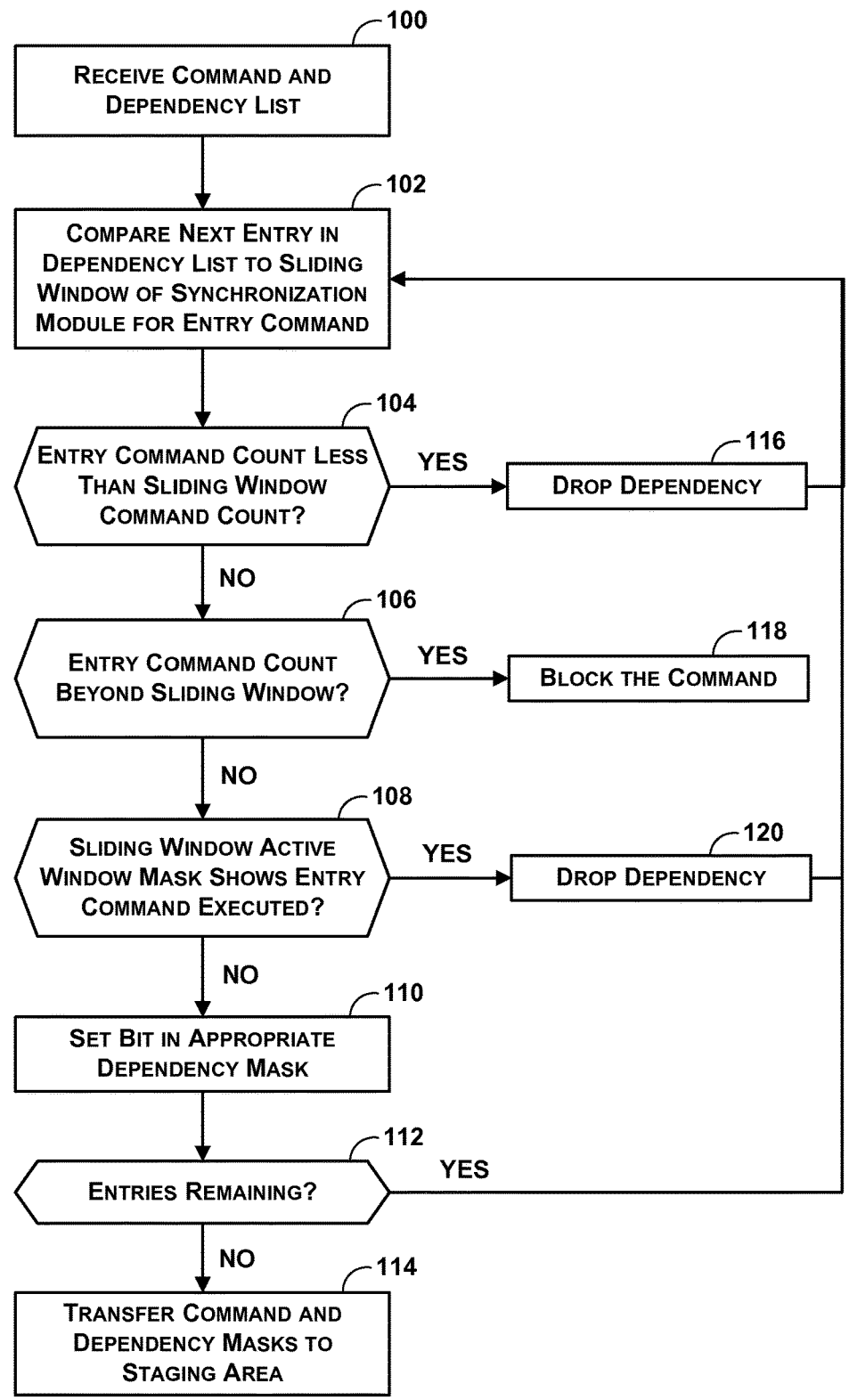
FIG. 8 is a flow chart illustrating an example mode of operation for a command distribution and synchronization processor that implements the out of order command execution.

FIG. 8 is a flow chart illustrating an example mode of operation for the CDS processor 12 of FIG. 4 that implements the out of order execution techniques described in this disclosure.

CDS processor 12 receives, as part of a command stream, a command having a dependency list (100). The dependency list contains entries, where each entry specifies a command in the command stream that is to be executed before the received command may itself be executed. CDS processor 12 processes the entries separately by comparing each entry in the dependency list to the sliding window of the appropriate synchronization module associated with the type of command specified by the entry (102).

First, CDS processor 12 determines whether the pipeline for the appropriate synchronization module has already executed the command specified by the entry. If the command count for the entry command is less than the command count for the synchronization module (YES branch of 104), the entry command has already executed and CDS processor drops the dependency (116). Otherwise (NO branch of 104), CDS processor 12 then compares the command count for the entry command with the command count and the length of the active window mask of the synchronization module to determine whether entry command is beyond the sliding window (106). If so (YES branch of 106), CDS processor 12 blocks the received command (118). The block will continue until the appropriate synchronization module for the entry command executes a sufficient number of commands to advance the sliding window to encompass the entry command.

If the entry command is encompassed by the sliding window (NO branch of 106), CDS processor 12 reads the bit in the bit place corresponding to the entry command in the active window mask of the appropriate synchronization module. If the bit is clear (i.e., has a value of "0"), the active window mask indicates that the entry command has executed (YES branch of 108). Accordingly, CDS processor 12 drops the dependency (120).

If, however, the bit is set (i.e., has a value of "1"), the entry command has not executed and the dependency remains (NO branch of 108). CDS processor 12 sets the bit that corresponds to the entry command in the appropriate dependency mask for the received command (110).

CDS processor 12 next determines whether any entries remain in the dependency list and, if so, applies the entry process for the next entry (YES branch of 112). Once CDS processor 12 has processed all entries (NO branch of 112), CDS processor 12 transfers the received command and the dependency masks generated by analyzing the dependency list entries to a slot in the staging area of the synchronization module associated with the received command.

Figure 9:
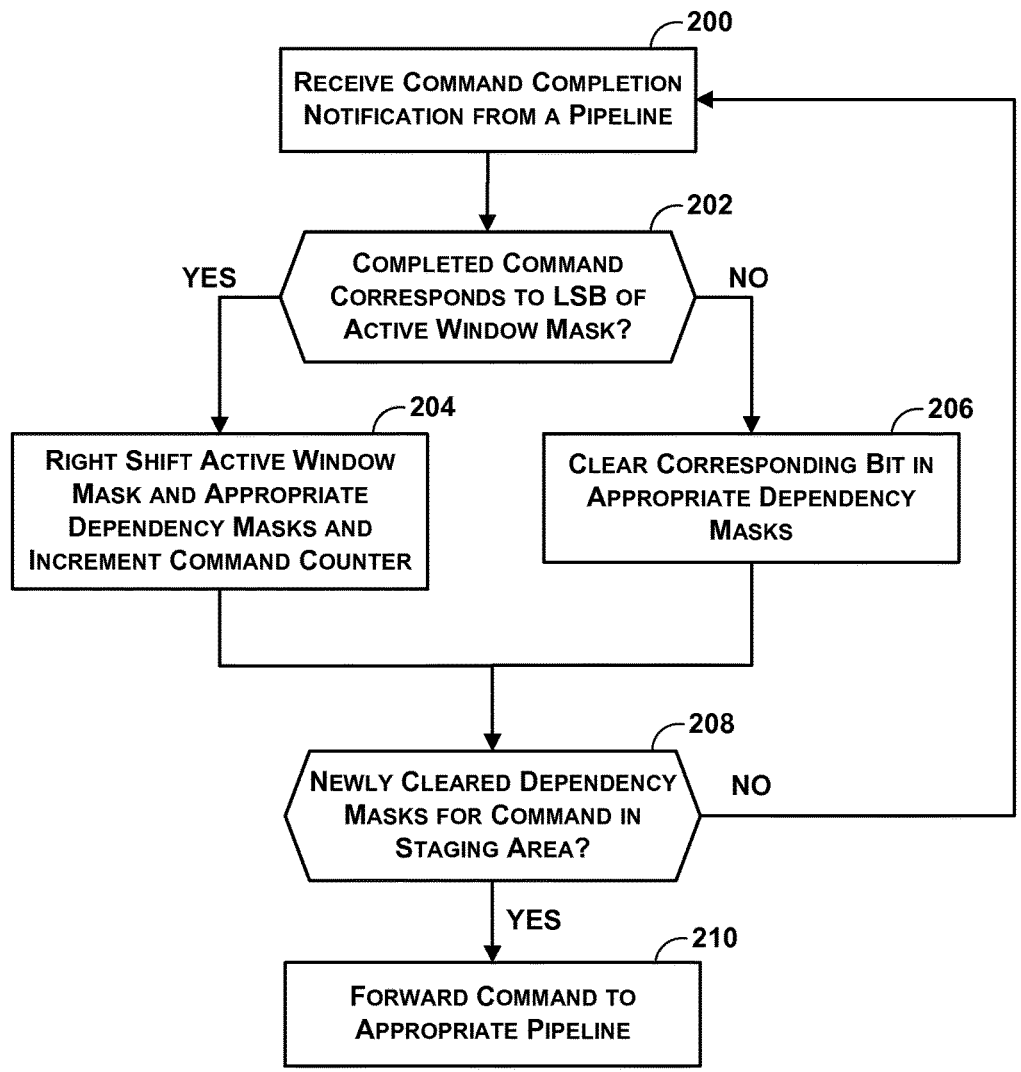
FIG. 9 is a flowchart illustrating an exemplary out of order execution operation by the exemplary command distribution and synchronization block of FIG. 4 in a manner consistent with this disclosure.

FIG. 9 is a flowchart illustrating an exemplary out of order execution operation by CDS processor 12 of FIG. 4 that implements the out of order execution techniques described in this disclosure.

A synchronization module 34A of CDS processor 12 receives from an associated pipeline a notification advising synchronization module 34A that the pipeline completed a command held by the staging area for synchronization module 34A (200). If the completed command corresponds to the least significant bit (LSB) of the active window mask 40A for synchronization module 34A (YES branch of 202), synchronization module 34A advances the sliding window by incrementing command counter 38A and right-shifting, by one bit, active window mask 40A (204). In addition, dependency mask module 44 of CDS processor 12 right-shifts, by one bit, all dependency masks in each of synchronization modules 34 that correspond to synchronization module 34A (204).

If the completed command does not correspond to the least significant bit (LSB) of the active window mask 40A for synchronization module 34A (NO branch of 202), dependency mask module 44, for the appropriate dependency masks, clears the bit in the bit place that corresponds to the completed command (206).

Dependency mask module 44 having managed the dependency masks, each of synchronization modules 34 determines whether the dependency masks for one or more commands held by the staging areas 36 are newly cleared (208). If not, the synchronization modules wait to receive additional command completion notifications from the associated pipelines (NO branch of 208). If however, dependency masks for one or more commands are newly cleared, then the dependencies for those commands have been satisfied and the commands may be executed (YES branch of 208). The synchronization modules 34 for the ready commands forward the commands to the appropriate pipeline for execution (210). In this manner, a command that has dependencies that are satisfied before the dependencies for another one or more commands that precede the command in the command stream may execute out of order, that is, prior to the preceding commands.

The techniques described in this disclosure may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware, or any combination thereof. In the figures, various components are depicted as separate units or modules. However, all or several of the various components described with reference to these figures may be integrated into combined units or modules within common hardware, firmware, and/or software. Furthermore, individual modules, units, or components described herein may be implemented as one or more sub-modules, sub-units, or sub-components that provide various of the described features or functionality. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-multimedia applications and devices. In some aspects, for example, such components may form part of a mobile device, such as a wireless communication device handset (e.g., a mobile telephone handset).

If implemented in software, the techniques may be realized at least in part by a computer-readable data storage medium comprising code with instructions that, when executed by one or more processors, performs one or more of the methods described above. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Software may be executed by one or more processors, such as one or more DSP's, general purpose microprocessors, ASIC's, FPGA's, or other equivalent integrated or discrete logic circuitry.

Various aspects have been described in this disclosure. These and other aspects are within the scope of the following claims.

The invention claimed is:

1. A method comprising:
receiving at least one command stream comprising first, second, and third commands, and inter-command dependency information, wherein receiving the inter-command dependency information in the at least one command stream comprises receiving the inter-command dependency information before execution of the first, second, and third commands, wherein the first, second, and third commands in the at least one command stream are in addition to the inter-command dependency information in the at least one command stream, wherein the inter-command dependency information comprises a dependency list for the second command, wherein the dependency list for the second command references, via command count values, any commands in the at least one command stream upon which the second command depends, wherein each command count value represents a respective previous command in the at least one command stream upon which the second command depends, wherein the second and third commands have a first order in the at least one command stream such that the second command precedes the third command;
determining, based on the dependency list for the second command, that the second command depends upon prior execution of the first command;
determining that the first command is associated with a first one of a plurality of processing pipelines and that the second command and third commands are associated with a second, different one of the plurality of processing pipelines;
distributing, by a processor, the third command to the second one of the plurality of processing pipelines based on determining that the second command depends upon prior execution of the first command;
after distributing the third command to the second one of the plurality of processing pipelines, distributing, by the processor and based on determining that the second command depends upon prior execution of the first command, the second command to the second one of the plurality of processing pipelines such that the second command and third command execute in a second order that is different than the first order;
maintaining a first sliding window to represent completion statuses of commands associated with the first one of the plurality of processing pipelines; and
maintaining a second sliding window to represent completion statuses of commands associated with the second one of the plurality of processing pipelines,
wherein the at least one command stream comprises a first set of ordered commands associated with the first one of the plurality of processing pipelines and a second set of ordered commands associated with the second one of the plurality of processing pipelines, and
wherein the first sliding window comprises a command counter that represents a start location of the first sliding window, wherein the start location corresponds to a last command in the first set of ordered commands for which no preceding command remains unexecuted by the first one of the plurality of processing pipelines.

2. The method of claim 1, wherein the first sliding window comprises an active window mask having a first bit that represents a completion status of the first command.

3. The method of claim 1, further comprising generating, based on the dependency list for the second command, a dependency mask for the second command, wherein bits in the dependency mask indicate the completion statuses for corresponding commands in the first sliding window.

4. The method of claim 3, wherein generating the dependency mask for the second command comprises:
determining a completion status of the first command; and
setting a given bit in the dependency mask for the second command when the first command has not been executed, wherein the given bit corresponds to the first command.

5. The method of claim 4,
wherein the first sliding window comprises an active window mask having a first bit that represents the completion status of the first command, and
wherein determining the completion status of the first command comprises evaluating the first bit of the active window mask.

6. The method of claim 3, further comprising:
receiving a notification from the first one of the plurality of processing pipelines that the first command has been executed;
responsive to the notification, clearing a bit in the dependency mask for the second command, wherein the bit corresponds to the first command.

7. The method of claim 3, further comprising:
receiving a notification from the first one of the plurality of processing pipelines that the first command completed; and
responsive to the notification, right-shifting the dependency mask by one bit when the first command corresponds to a least significant bit in the dependency mask.

8. The method of claim 3, wherein distributing the second command to the first one of the plurality of processing pipelines comprises:
determining whether a bit in the dependency mask that corresponds to the first command is clear; and
distributing the second command to the first one of the plurality of processing pipelines only when the bit in the dependency mask that corresponds to the first command is clear.

9. The method of claim 1, further comprising:
receiving a notification from the first one of the plurality of processing pipelines that the first command completed; and
responsive to the notification, advancing the first sliding window.

10. The method of claim 1,
wherein the at least one command stream further comprises a fourth command, wherein the inter-command dependency information comprises a dependency list for the fourth command, wherein the dependency list for the fourth command references, via command count values, any commands in the at least one command stream upon which the fourth command depends, wherein each command count value represents a respective previous command in the at least one command stream upon which the fourth command depends, wherein the second command has a priority value and the fourth command has a priority value, and wherein the method further comprises:
determining, based on the dependency list for the fourth command, that the fourth command depends upon prior execution of the first command;
determining that the fourth command is associated with the second one of the plurality of processing pipelines; and
distributing the second command and the fourth command to the second one of the plurality of processing pipelines in an order based on the priority values of the second command and the fourth command.

11. An apparatus comprising:
a command distribution and synchronization processor,
wherein the command distribution and synchronization processor is configured to:
receive at least one command stream comprising first, second, and third commands, and inter-command dependency information;
receive the inter-command dependency information in the at least one command stream before execution of the first, second, and third commands, wherein the first, second, and third commands in the at least one command stream are in addition to the inter-command dependency information in the at least one command stream, wherein the inter-command dependency information comprises a dependency list for the second command, wherein the dependency list for the second command references, via command count values, any commands in the at least one command stream upon which the second command depends, wherein each command count value represents a respective previous command in the at least one command stream, wherein the second and third commands have a first order in the at least one command stream such that the second command precedes the third command;
determine, based on the dependency list for the second command, that the second command depends upon prior execution of the first command;
determine that the first command is associated with a first one of a plurality of processing pipelines and that the second command and third commands are associated with a second, different one of the plurality of processing pipelines;
distribute the third command to the second one of the plurality of processing pipelines based on determining that the second command depends upon prior execution of the first command;
after distributing the third command to the second one of the plurality of processing pipelines, distribute, based on determining that the second command depends upon prior execution of the first command, the second command to the second one of the plurality of processing pipelines such that the second command and third command execute in a second order that is different than the first order;
maintain a first sliding window to represent completion statuses of commands associated with the first one of the plurality of processing pipelines; and
maintain a second sliding window to represent completion statuses of commands associated with the second one of the plurality of processing pipelines,
wherein the at least one command stream comprises a first set of ordered commands associated with the first one of the plurality of processing pipelines and a second set of ordered commands associated with the second one of the plurality of processing pipelines, and wherein the first sliding window comprises a command counter that represents a start location of the first sliding window, wherein the start location corresponds to a last command in the first set of ordered commands for which no preceding command remains unexecuted by the first one of the plurality of processing pipelines.

12. The apparatus of claim 11, wherein the first sliding window comprises an active window mask having a first bit that represents a completion status of the first command.

13. The apparatus of claim 11, wherein the command distribution and synchronization processor is further configured to generate, based on the dependency list for the second command, a dependency mask for the second command, wherein bits in the dependency mask indicate the completion statuses for corresponding commands in the first sliding window.

14. The apparatus of claim 13, wherein, to generate the dependency mask for the second command, the command distribution and synchronization processor is further configured to:
 determine a completion status of the first command; and
 set a given bit in the dependency mask for the second command when the first command has not been executed, wherein the given bit corresponds to the first command.

15. The apparatus of claim 14,
wherein the first sliding window comprises an active window mask having a first bit that represents the completion status of the first command, and
wherein, to determine the completion status of the first command, the command distribution and synchronization processor is further configured to evaluate the first bit of the active window mask.

16. The apparatus of claim 13, wherein the command distribution and synchronization processor is further configured to:
 receive a notification from the first one of the plurality of processing pipelines that the first command has been executed;
 responsive to the notification, clear a bit in the dependency mask for the second command, wherein the bit corresponds to the first command.

17. The apparatus of claim 13, wherein the command distribution and synchronization processor is further configured to:
 receive a notification from the first one of the plurality of processing pipelines that the first command completed; and
 responsive to the notification, right-shift the dependency mask by one bit when the first command corresponds to a least significant bit in the dependency mask.

18. The apparatus of claim 13, wherein, to distribute the second command to the first one of the plurality of processing pipelines, the command distribution and synchronization processor is further configured to:
 determine whether a bit in the dependency mask that corresponds to the first command is clear; and
 distribute the second command to the first one of the plurality of processing pipelines only when the bit in the dependency mask that corresponds to the first command is clear.

19. The apparatus of claim 11, wherein the command distribution and synchronization processor is further configured to:
 receive a notification from the first one of the plurality of processing pipelines that the first command completed; and
 responsive to the notification, advance the first sliding window.

20. The apparatus of claim 11,
wherein the at least one command stream further comprises a fourth command, wherein the inter-command dependency information comprises a dependency list for the fourth command, wherein the dependency list for the fourth command references, via command count values, any commands in the at least one command stream upon which the fourth command depends, wherein each command count value represents a respective previous command in the at least one command stream upon which the fourth command depends,
wherein the second command has a priority value and the fourth command has a priority value, and
wherein the command distribution and synchronization processor is further configured to:
 determine, based on the dependency list for the fourth command, that the fourth command depends upon prior execution of the first command;
 determine that the fourth command is associated with the second one of the plurality of processing pipelines; and
 distribute the second command and the fourth command to the second one of the plurality of processing pipelines in an order based on the priority values of the second command and the fourth command.

21. The apparatus of claim 11, wherein the apparatus comprises a wireless communication device handset.

22. The apparatus of claim 11, wherein the apparatus comprises one or more integrated circuit devices.

23. A non-transitory computer-readable storage medium comprising instructions that, when executed, cause a programmable processor to:
 receive at least one command stream comprising first, second, and third commands, and inter-command dependency information;
 receive the inter-command dependency information in the at least one command stream before execution of the first, second, and third commands, wherein the first, second, and third commands in the at least one command stream are in addition to the inter-command dependency information in the at least one command stream, wherein the inter-command dependency information comprises a dependency list for the second command, wherein the dependency list for the second command references, via command count values, any commands in the at least one command stream upon which the second command depends, wherein each command count value represents a respective previous command in the at least one command stream, wherein the second and third commands have a first order in the at least one command stream such that the second command precedes the third command;
 determine, based on the dependency list for the second command, that the second command depends upon prior execution of the first command;
 determine that the first command is associated with a first one of a plurality of processing pipelines and that the second command and third commands are associated with a second, different one of the plurality of processing pipelines;

distribute the third command to the second one of the plurality of processing pipelines based on determining that the second command depends upon prior execution of the first command;

after distributing the third command to the second one of the plurality of processing pipelines, distribute, based on determining that the second command depends upon prior execution of the first command, the second command to the second one of the plurality of processing pipelines such that the second command and third command execute in a second order that is different than the first order;

maintain a first sliding window to represent completion statuses of commands associated with the first one of the plurality of processing pipelines; and maintain a second sliding window to represent completion statuses of commands associated with the second one of the plurality of processing pipelines, wherein the at least one command stream comprises a first set of ordered commands associated with the first one of the plurality of processing pipelines and a second set of ordered commands associated with the second one of the plurality of processing pipelines, and wherein the first sliding window comprises a command counter that represents a start location of the first sliding window, wherein the start location corresponds to a last command in the first set of ordered commands for which no preceding command remains unexecuted by the first one of the plurality of processing pipelines.

24. The non-transitory computer-readable storage medium of claim 23, wherein the first sliding window comprises an active window mask having a first bit that represents a completion status of the first command.

25. The non-transitory computer-readable storage medium of claim 23, further comprising instructions to cause the programmable processor to generate, based on the dependency list for the second command, a dependency mask for the second command, wherein bits in the dependency mask indicate the completion statuses for corresponding commands in the first sliding window.

26. The non-transitory computer-readable storage medium of claim 25, wherein, to generate the dependency mask for the second command, the computer-readable storage medium further comprises instructions to cause the programmable processor to:
determine a completion status of the first command; and
set a given bit in the dependency mask for the second command when the first command has not been executed, wherein the given bit corresponds to the first command.

27. The non-transitory computer-readable storage medium of claim 26,
wherein the first sliding window comprises an active window mask having a first bit that represents the completion status of the first command, and
wherein, to determine the completion status of the first command, the computer-readable storage medium further comprises instructions to cause the programmable processor to evaluate the first bit of the active window mask.

28. The non-transitory computer-readable storage medium of claim 25, further comprising instructions to cause the programmable processor to:

receive a notification from the first one of the plurality of processing pipelines that the first command has been executed;
responsive to the notification, clear a given bit in the dependency mask for the second command, wherein the given bit corresponds to the first command.

29. The non-transitory computer-readable storage medium of claim 25, further comprising instructions to cause the programmable processor to:
receive a notification from the first one of the plurality of processing pipelines that the first command completed; and
responsive to the notification, right-shift the dependency mask by one bit when the first command corresponds to a least significant bit in the dependency mask.

30. The non-transitory computer-readable storage medium of claim 25, wherein, to distribute the second command to the first one of the plurality of processing pipelines, the computer-readable storage medium further comprises instructions to cause the programmable processor to:
determine whether a bit in the dependency mask that corresponds to the first command is clear; and
distribute the second command to the first one of the plurality of processing pipelines only when the bit in the dependency mask that corresponds to the first command is clear.

31. The non-transitory computer-readable storage medium of claim 23, further comprising instructions to cause the programmable processor to:
receive a notification from the first one of the plurality of processing pipelines that the first command completed; and
responsive to the notification, advance the first sliding window.

32. The non-transitory computer-readable storage medium of claim 23,
wherein the at least one command stream further comprises a fourth command, wherein the inter-command dependency information comprises a dependency list for the fourth command, wherein the dependency list for the fourth command references, via command count values, any commands in the at least one command stream upon which the fourth command depends, wherein each command count value represents a respective previous command in the at least one command stream upon which the fourth command depends, wherein the second command has a priority value and the fourth command has a priority value, and wherein the computer-readable storage medium further comprises instructions to cause the programmable processor to:
determine, based on the dependency list for the fourth command, that the fourth command depends upon prior execution of the first command;
determine that the fourth command is associated with the second one of the plurality of processing pipelines; and
distribute the second command and the fourth command to the second one of the plurality of processing pipelines in an order based on the priority values of the second command and the fourth command.

* * * * *